United States Patent
Kvieska et al.

(10) Patent No.: US 11,654,966 B2
(45) Date of Patent: May 23, 2023

(54) METHOD FOR CONTROLLING THE LATERAL POSITION OF A MOTOR VEHICLE

(71) Applicant: Nissan Motor Co., Ltd., Yokohama (JP)

(72) Inventors: Pedro Kvieska, Versailles (FR); Simon Mustaki, Paris (FR); Raphael Quilliard, Massy (FR)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/760,785

(22) PCT Filed: Sep. 3, 2020

(86) PCT No.: PCT/EP2020/074610
§ 371 (c)(1),
(2) Date: Mar. 16, 2022

(87) PCT Pub. No.: WO2021/052771
PCT Pub. Date: Mar. 25, 2021

(65) Prior Publication Data
US 2022/0355862 A1 Nov. 10, 2022

(30) Foreign Application Priority Data

Sep. 17, 2019 (FR) ..................... 1910267

(51) Int. Cl.
*B62D 15/02* (2006.01)
*B62D 6/00* (2006.01)

(52) U.S. Cl.
CPC .......... *B62D 15/025* (2013.01); *B62D 6/001* (2013.01); *B62D 15/021* (2013.01)

(58) Field of Classification Search
CPC ..... B62D 15/025; B62D 6/001; B62D 15/021
See application file for complete search history.

(56) References Cited

U.S. PATENT DOCUMENTS

| | | | |
|---|---|---|---|
| 2006/0020382 A1* | 1/2006 | Shin | ............... B62D 7/159 |
| | | | 180/443 |
| 2007/0213902 A1* | 9/2007 | Shin | ............... B62D 6/007 |
| | | | 701/42 |

(Continued)

OTHER PUBLICATIONS

Kosecka J et al., A Comparative Study of Vision-Based Lateral Control Strategies for Autonomous Highway Driving, Proceedings. 1998 IEEE International Conference on Robotics and Automation, May 16-20, 1988, pp. 1903-1908, vol. 3, IEEE, U.S.

(Continued)

*Primary Examiner* — Peter D Nolan
*Assistant Examiner* — Demetra R Smith-Stewart
(74) *Attorney, Agent, or Firm* — Global IP Counselors, LLP (57) ABSTRACT

A control method is provided for controlling a lateral position of a motor vehicle. The control method includes calculating a sighting distance of a detector means embedded in the vehicle, calculating a first component of a steering angle setpoint of a steered wheels of the vehicle, and calculating a second component of the steering angle setpoint. The first component is an open loop component of a control system, while the second component is a closed loop component of the control system. The first component is weighted by a gain that is a decreasing function of the sighting distance.

14 Claims, 5 Drawing Sheets

E1   Calculate reference path.
E2   Calculate future lateral acceleration.
E3   Compare lateral acceleration to threshold.
E4   Calculate gain.
E41  Calculate sighting distance of detection means.
E42  Calculate gain based on function of sighting distance.
E5   Calculate open loop component of steering angle setpoint.
E6   Calculate closed loop component of steering angle setpoint.
E61  Calculate observed state vector.
E62  Calculate closed loop component based on comparison of reference state vector and hybrid state vector.
E7   Calculate steering angle setpoint.

(56) References Cited

U.S. PATENT DOCUMENTS

2009/0118905 A1* 5/2009 Takenaka ................. B62D 6/04
                                                              701/41
2018/0304917 A1* 10/2018 Michelis ............... B60W 10/16
2022/0355862 A1* 11/2022 Kvieska ............. B60W 30/045

OTHER PUBLICATIONS

Kamat, Lane Keeping of Vehicle Using Model Predictive Control, 2019 IEEE 5th International Conference for Convergence in Technology (I2CT), Mar. 29, 2019, pp. 1-6, IEEE, U.S.
Amer et al., Modelling and Control Strategies in Path Tracking Control for Autonomous Ground Vehicles: A Review of State of the Art and Challenges, Journal of Intelligent and Robotic Systems, Nov. 22, 2016, vol. 86, No. 2, pp. 225-254, Springer, Germany.

* cited by examiner

| | |
|---|---|
| E1 | Calculate reference path. |
| E2 | Calculate future lateral acceleration. |
| E3 | Compare lateral acceleration to threshold. |
| E4 | Calculate gain. |
| E41 | Calculate sighting distance of detection means. |
| E42 | Calculate gain based on function of sighting distance. |
| E5 | Calculate open loop component of steering angle setpoint. |
| E6 | Calculate closed loop component of steering angle setpoint. |
| E61 | Calculate observed state vector. |
| E62 | Calculate closed loop component based on comparison of reference state vector and hybrid state vector. |
| E7 | Calculate steering angle setpoint. |

METHOD FOR CONTROLLING THE LATERAL POSITION OF A MOTOR VEHICLE

CROSS-REFERENCE TO RELATED APPLICATIONS

This application is a U.S. national stage application of International Application No. PCT/EP2020/074610, filed on Sep. 3, 2020.

BACKGROUND

Technical Field

The invention relates to a method for controlling the lateral position of a motor vehicle, notably of a vehicle equipped with a driver assistance system. The invention relates also to a motor vehicle comprising hardware and/or software means implementing such a method. The invention relates finally to a method for calibrating such a vehicle.

Background Information

A vehicle equipped with a driver assistance system generally comprises a computer-controlled steering system. The steering system controls the orientation of the steered wheels of the vehicle such that the vehicle follows a given path. The computer implements control methods that make it possible to laterally position the vehicle on a traffic lane. In particular, the computer can implement a control method called LCA (the acronym for "Lane Centering Assist") that allows a vehicle to be kept at the center of its traffic lane.

Such control methods need to allow a vehicle to be steered gently and without jerks along a given path. However, it is found that the quality of the control performed by the vehicles known from the state of the art is degraded when the state of the vehicle and/or the outside conditions vary. Notably, the loading of the vehicle, the position of its center of gravity, the state of its tires or the type of tires used influence the dynamic behavior of the vehicle, notably when making a turn. Steering angle setpoints calculated upon the execution of the control method can lead to a path that is significantly different from the planned path. Movements to correct the lateral position of the vehicle follow therefrom. These correction movements can be notably late, even inadequate, and create a discomfort for the passengers of the vehicle. Degraded performance can therefore be felt if the state of the vehicle is modified, but also if the conditions outside the vehicle vary, such as, for example, a modification of the road grip and/or a modification of the force or direction of the wind.

Methods are known for calculating the steering angle setpoint of steered wheels that rely on the use of vehicle state sensors in order to adapt a control law. However, identifying the factors that disrupt the dynamic behavior of a vehicle remains complex and difficult. Furthermore, such sensors are complex to incorporate in a vehicle. These methods are therefore complex to implement and do not make it possible to completely overcome the lateral accelerations undergone by the vehicle.

SUMMARY

The aim of the invention is to provide a method for controlling the lateral position of a motor vehicle that remedies the above drawbacks and that enhances the control methods known from the prior art.

More specifically, a first subject of the invention is a method for controlling the lateral position of a motor vehicle which is more independent of the state of the vehicle or of the conditions outside the vehicle.

A second subject of the invention is a method for controlling the lateral position of a motor vehicle which is both more independent of the state of the vehicle and/or of the conditions outside the vehicle, and which does not require the use of vehicle state sensors or of sensors of conditions outside the vehicle, nor even the identification of the factors that modify the dynamic behavior of the vehicle.

In the present disclosure, a control method is disclosed for controlling the lateral position of a motor vehicle. The control method comprises calculating a sighting distance of a detection means embedded in the vehicle, calculating a first component of a steering angle setpoint of steered wheels of the vehicle, and calculating a second component of the steering angle setpoint, the second component being a closed loop component of the control system. The first component is an open loop component of a control system. The second component is a closed loop component of the control system. The first component is weighted by a gain that is a decreasing function of the sighting distance.

The gain can lie between 0 and 1 inclusive.

The gain can be a decreasing linear function of the sighting distance, and/or the gain can be equal to 1 when the sighting distance is zero.

The control method can comprise calculating the steering angle setpoint, the steering angle setpoint being equal to the sum of the open loop component and of the closed loop component.

The calculating of the second component can comprise calculating a state vector of the vehicle, the state vector comprising a component equal to a lateral deviation of the vehicle with respect to a reference path at the sighting distance.

The calculating of the second component of the steering angle setpoint can comprise multiplying the lateral deviation of the vehicle at the sighting distance by the sighting distance.

The control method can comprise calculating a future lateral acceleration of the vehicle, comparing the lateral acceleration to a threshold, then, calculating the first component of the steering angle setpoint when the lateral acceleration is greater than or equal to the threshold where the first component is weighted by a gain equal to a predefined value, independent of the sighting distance. Calculating the first component of the steering angle setpoint when the lateral acceleration is strictly less than the threshold where the first component is weighted by a gain, the gain being a decreasing function of the sighting distance.

The calculating of a future lateral acceleration of the vehicle can comprise a substep of acquiring a curvature of a traffic lane via a navigation system.

The calculating of the sighting distance can comprise a selection of a minimum value between a predefined distance and a viewing range of the detection means of the vehicle.

The disclosure also discloses a computer program product comprising program code instructions stored on a medium that can be read by an electronic control unit for implementing the steps of the control method as defined previously when said program runs on an electronic control unit.

The disclosure also discloses a computer program product that can be downloaded from a communication network and/or stored on a data medium that can be read by a computer and/or that can be executed by a computer, comprising instructions which, when the program is executed by the computer, cause the latter to implement the control method as defined previously.

The disclosure also discloses a data storage medium, that can be read by an electronic control unit, on which is stored a computer program comprising program code instructions for implementing the control method as defined previously.

The disclosure also discloses a computer-readable storage medium comprising instructions which, when they are executed by a computer, cause the latter to implement the control method as defined previously.

The disclosure also discloses a signal from a data medium, bearing the computer program product as defined previously.

The disclosure also discloses a steering system comprising hardware means and/or software means implementing the control method as defined previously.

The disclosure also discloses a motor vehicle comprising a steering system as defined previously.

The disclosure also discloses to a method for calibrating a vehicle as defined previously, the calibration method comprising measuring a reference lateral deviation of the vehicle with respect to a reference path when the vehicle makes a first journey, the sighting distance being defined as equal to zero, gradually increasing the sighting distance and of reducing the gain as long as the lateral deviation of the vehicle with respect to the reference path is substantially equal to the reference lateral deviation when the vehicle makes the first journey, defining the sighting distance as equal to a predefined distance, and gradually increasing the gain until the lateral deviation of the vehicle with respect to a reference path is less than or equal to a threshold, when the vehicle makes a second journey.

These subjects, features and advantages of the present invention will be explained in detail in the following description of a particular embodiment given in a nonlimiting manner in relation to the attached figures.

BRIEF DESCRIPTION OF THE DRAWINGS

Referring now to the attached drawings which form a part of this original disclosure.

DETAILED DESCRIPTION OF EMBODIMENTS

These subjects, features and advantages of the present invention will be explained in detail in the following description of a particular embodiment given in a nonlimiting manner in relation to the attached figures, in which: Embodiments of the present invention are described below with reference to drawings, etc.

Figure 1:
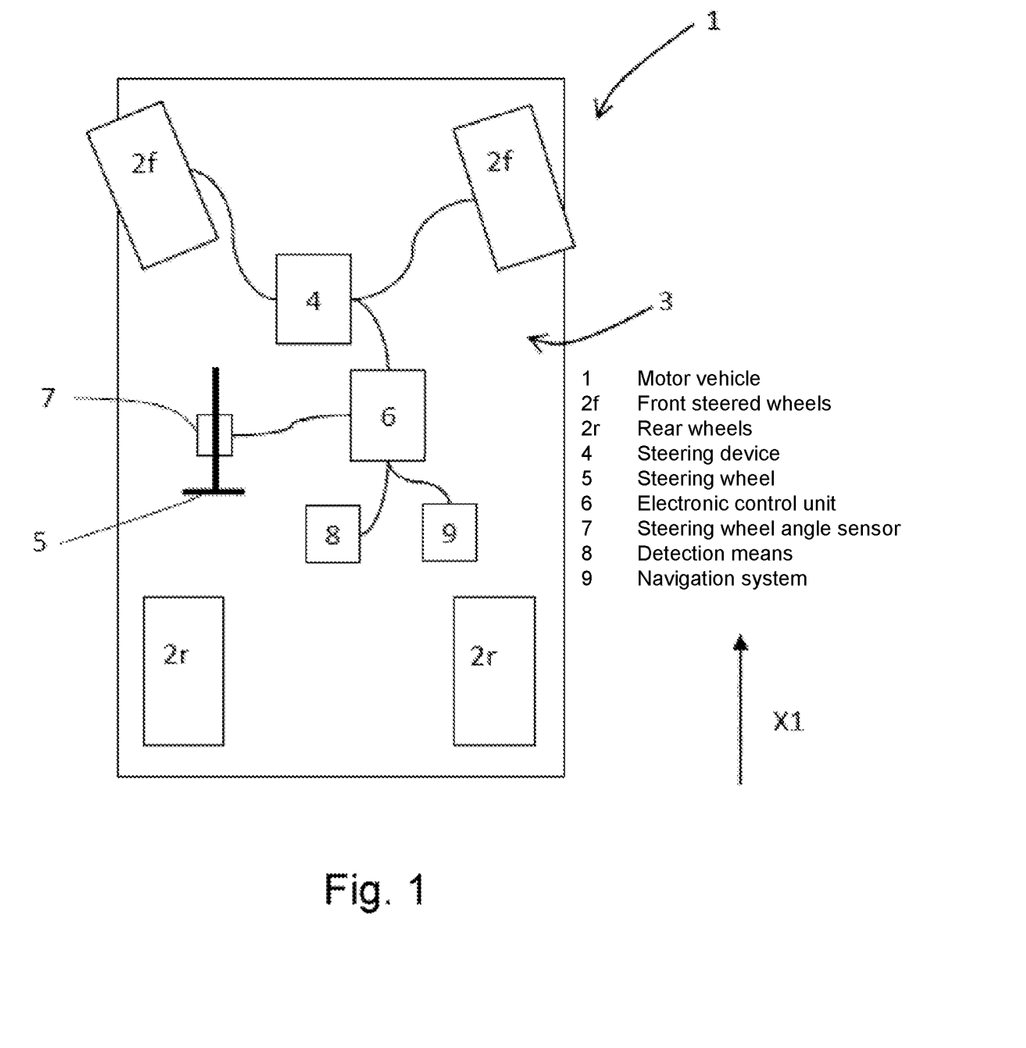
FIG. 1 is a schematic view of a motor vehicle according to an embodiment of the invention.

FIG. 1 schematically illustrates a motor vehicle 1 according to an embodiment of the invention. The vehicle 1 can be of any kind. Notably, it can for example be a car, a utility vehicle, a truck or a bus. The vehicle 1 comprises two front steered wheels $2f$ and two rear wheels $2r$. The orientation of the steered wheels $2f$ can be controlled by a steering system 3. The steering system 3 comprises a steering device 4 mechanically linked with the two front wheels $2f$ and a steering wheel 5 mechanically linked with the steering device 4. The steering system 3 further comprises an electronic control unit 6 and a steering wheel angle sensor 7. The steering wheel angle sensor 5 can measure the orientation of the steering wheel 7. It can notably measure the angular position of a steering column linked to the steering wheel 7. The orientation of the steering wheel 7 is proportional to the orientation of the steered wheels $2f$, that is to say the steering angle of the steered wheels $2f$. Thus, a control of a steering angle of the steered wheels depends on the control of a steering wheel angle of the vehicle 1. Moreover, the vehicle 1 can also be equipped with other sensors such as a yaw sensor and/or at least one wheel speed sensor allowing the speed of the vehicle to be determined.

The electronic control unit 6 is electrically linked to the steering wheel angle sensor 7, to the steering device 4, and possibly to other sensors of the vehicle and/or to other electronic control units or computers of the vehicle 1. It notably comprises a memory, a microprocessor and input/output interfaces for receiving data from other equipment of the vehicle 1 or for sending data for the attention of other equipment of the vehicle 1. The memory of the electronic control unit is a data storage medium on which is stored a computer program comprising program code instructions for implementing a method according to an embodiment of the invention. The microprocessor can execute this method. Notably, the electronic control unit 6 can send control instructions to the steering device 4 via its input/output interface so as to steer, that is to say orient, the steered wheels according to a calculated angle. A longitudinal axis X1 of the vehicle can be defined as the axis parallel to the direction in which the vehicle is directed in a straight line.

The vehicle 1 also comprises detection means 8 for detecting the environment of the vehicle 1, such as, for example, radars, and/or lidars and/or cameras. These detection means can be elements of the steering system. The detection means 8 are also linked to the electronic control unit 6. The vehicle 1 is a vehicle equipped with a driver assistance system.

The vehicle 1 finally comprises a navigation system 9. The navigation system notably comprises a database of roads that can be taken by the vehicle. The navigation system can calculate the curvature of a road on which the vehicle is traveling or of a road on which the vehicle is about to travel. The navigation system is linked to the electronic control unit 6 and the value of this curvature can be transmitted to it.

Figure 2:
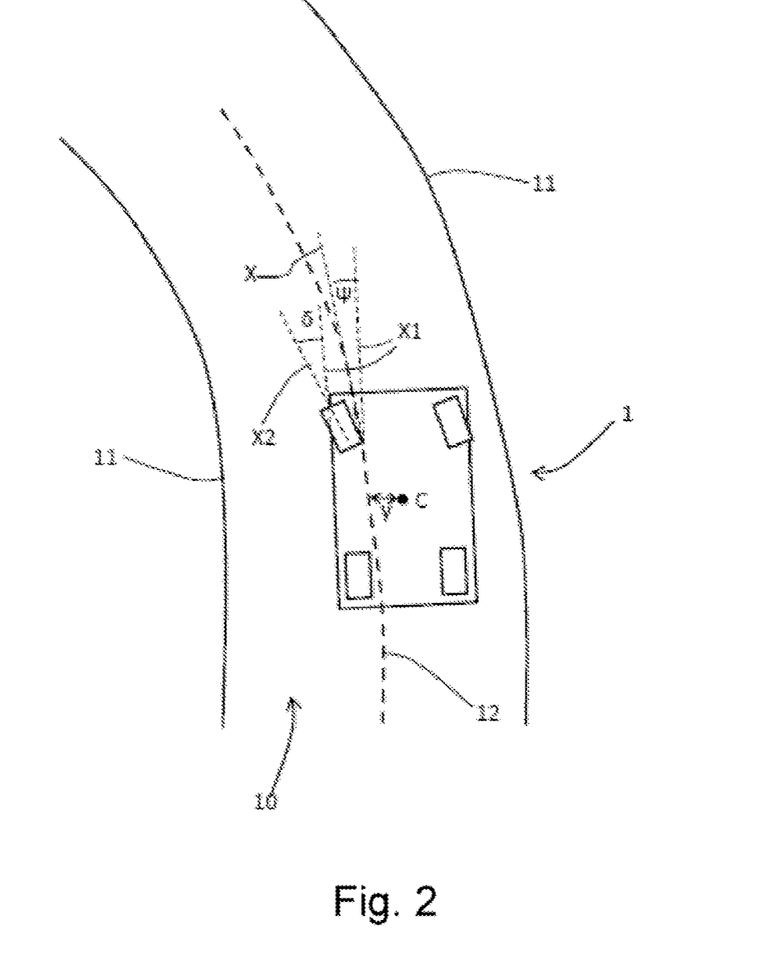
FIG. 2 is a first top schematic view of the vehicle on a traffic lane.

FIG. 2 illustrates the vehicle 1 traveling on a traffic lane 10. The traffic lane 10 is delimited on the left and on the right by two demarcation lines 11, materialized on the traffic lane for example in the form of continuous lines or broken lines, colored white or yellow. The detection means 8 are capable of identifying the demarcation lines 11. The electronic control unit comprises software means that make it possible to calculate a reference path 12 or setpoint path. The reference path 12 is identified by a dotted line in FIG. 2. The reference path 12 is a theoretical line, not visible on the traffic lane 10. The reference path 12 can, for example, embody the center of the lane and correspond for example to a line situated equidistant from the two demarcation lines 11. As a variant, the reference path 12 could be defined differently. It could be offset more toward one or other of the two demarcation lines 11. It could also be calculated as a function of the detection of obstacles or of other vehicles present on the traffic lane or on traffic lanes adjacent to the traffic lane 10.

In this document, the longitudinal axis X is defined as the axis of the traffic lane parallel to the reference path at the height of the vehicle 1, for example at the height of its center of gravity. The transverse axis Y is the axis of the traffic lane at right angles to the reference path at the height of the vehicle 1. The axis Z denotes perpendicular to the longitudinal axis X and to the transverse axis Y. The traffic lane illustrated in FIG. 2 is a traffic lane turning to the left. However, the invention can equally be implemented when the traffic lane is a straight line or turning to the right.

The state of the vehicle, that is to say its position on the traffic lane 10 and its path, can be characterized by a set of physical quantities, or state variables, represented partly in FIG. 2. In particular, the state of the vehicle can be characterized by the following quantities:
- a yaw speed $d\psi/dt$ of the vehicle, and/or
- a heading angle $\psi$ of the vehicle, and/or
- a lateral speed $dy/dt$ of the vehicle, and/or
- a lateral deviation y of the vehicle with respect to a reference path, and/or
- a steering speed $d\delta/dt$ of the steered wheels of the vehicle, and/or
- a steering angle $\delta$ of the steered wheels of the vehicle, and/or
- an integral of the lateral deviation Iy of the vehicle with respect to a reference path.

The yaw speed $d\psi/dt$ is the speed of rotation of the vehicle about the axis Z. The yaw speed can be measured for example by means of a yaw sensor. The heading angle $\psi$ can be defined as the angle formed between the longitudinal axis X of the traffic lane 10, that is to say the axis tangential to the reference path 12 at the height of the vehicle, and the longitudinal axis X1 of the vehicle. The lateral deviation y can be defined as the distance separating a point of the vehicle (notably its center of gravity C) from the reference path 12. As a variant, the lateral deviation y could also measure the distance separating a point of the vehicle from a demarcation line 11. The heading angle $\psi$ and the lateral deviation y can be calculated for example using the detection means 8 of the vehicle. The lateral speed $dy/dt$ is the derivative with respect to time of the lateral deviation y. The integral of the lateral deviation Iy can be calculated with respect to time and from an initial moment corresponding to the moment of activation of the control method.

The steering angle $\delta$ of the steered wheels can be defined as the angle formed between the axis X2 parallel to the rolling direction of the front steered wheels and the longitudinal axis X1 of the vehicle. The steering angle $\delta$ is proportional to the steering wheel angle measured by the steering wheel angle sensor 7. Note that, when the vehicle turns, the two steered wheels of a vehicle are generally steered at slightly different angles in order to take account of the different radii of curvature followed by each of the steered wheels. These differences can then be considered negligible. Thus, the state of the vehicle can be simplified by using a so-called "bicycle" model, that is to say by considering a single steered wheel whose steering angle makes the vehicle follow the same curvature as would two steered wheels with different steering angles. The steering angle of the steered wheels using the "bicycle" model can, for example, be a mean angle between the steering angle of the left steered wheel and the steering angle of the right steered wheel. The steering speed $d\delta/dt$ of the steered wheels is the derivative with respect to time of the steering angle $\delta$.

Figure 3:
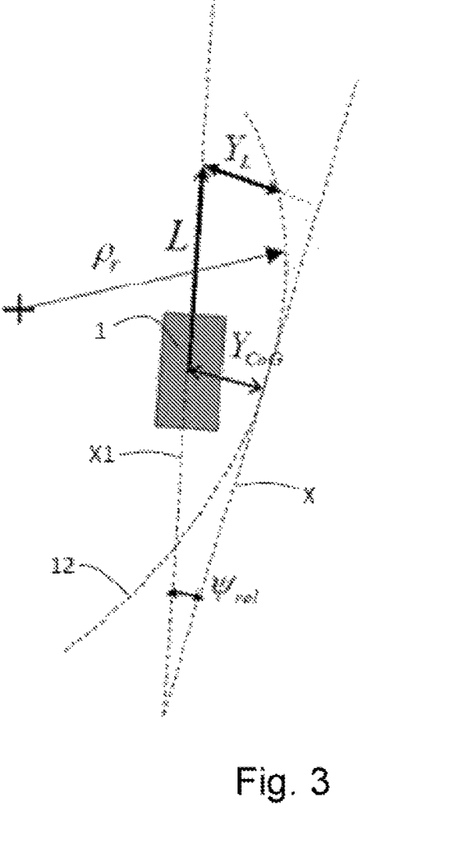
FIG. 3 is a second top schematic view of the vehicle on a traffic lane.

A sighting distance L can be defined as the minimum value between a predefined distance Lmax and a viewing range of the detection means of the vehicle Lrange. The viewing range of the detection means is the maximum distance for which the detection means can detect the environment with a good level of confidence or with sufficient sharpness. The viewing range depends notably on the sensitivity of the sensors embedded in the detection means but also on the brightness conditions and/or the weather or atmospheric conditions. The viewing range depends also on the typology of the traffic lane taken and on the possible presence of an obstacle or of another vehicle in front of the detection means 8. In particular, when the vehicle begins a turn, the viewing range of the detection means 8 can be reduced. The predefined distance Lmax can be a value defined by calibration of the vehicle. It can for example be defined with a value of 30 meters.

The sighting distance L is notably represented in FIG. 3. As imaged, the sighting distance can be seen as a "fishing rod" attached to the roof of the vehicle. The lateral deviation yL at the sighting distance can be defined as the lateral distance separating the reference path 12 and the end of the "fishing rod". In other words, the lateral deviation yL corresponds to the lateral deviation between the reference path 12 and a point which is at a sighting distance L in front of the vehicle 1, in the direction at right angles to the tangent to the reference path at the vehicle.

The lateral deviation yL is measured by the camera which supplies the lateral deviation in real time, notably at the center of gravity C of the vehicle, in the form of a polynomial, which makes it possible to know the lateral deviation at any distance (within the limit of the field of the camera) and notably at the distance L.

Figure 4:
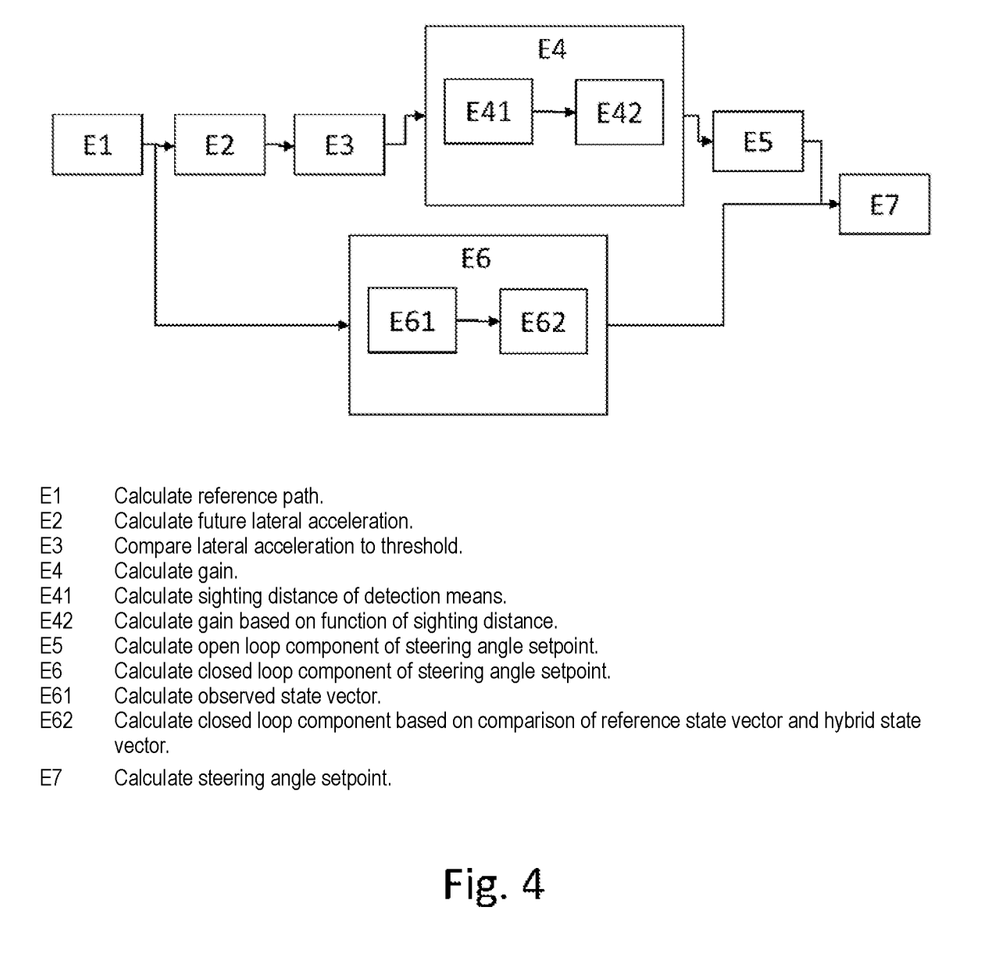
FIG. 4 is a block diagram of a control method according to an embodiment of the invention.

Referring to FIG. 4, a method for controlling the lateral position of the vehicle 1 is now described according to an embodiment of the invention. The method can be broken down into seven steps: E1 to E7. This driver assistance method can be repeated at a given frequency. As will be detailed hereinbelow, the control method relies on a control system, also called regulator. The control system comprises a first open loop component FFD (also called "feedforward") and a second closed loop component FBK (also called "feedback"). By its nature, the loop FFD is reactive while the loop FBK is slower, which makes it possible to improve the comfort and correct the errors of the open loop model. The steering angle setpoint of the steered wheels is obtained by the sum of the first component FFD and of the second component FBK. The invention makes it possible, in turning, to unload the FFD component while compensating by an adaptation of the FBK component to make the turning more robust and improve the sensation of the driver who thus will benefit from greater comfort.

In a first step E1, the reference path 12 is calculated. The reference path is the path which will be followed by the vehicle. To this end, it is possible for example to detect the demarcation lines 11 with the detection means 8 then calculate the reference path 12 as the line situated equidistant from the two demarcation lines 11. The reference path can be represented by a reference state vector Xref, used as input for the control system.

The reference state vector Xref is therefore calculated as a function of the reference path 12.

In a second step E2, the future lateral acceleration of the vehicle is calculated, that is to say the lateral acceleration that the vehicle will support after a time TO which can, for example, be defined by calibration. To this end, it is possible to first of all determine the curvature of the traffic lane 10 in front of the vehicle and combine this value with the speed of the vehicle, and possibly the acceleration of the vehicle, to estimate a lateral acceleration when the vehicle will be traveling this curvature. For example, the lateral acceleration aymax of the vehicle can be calculated with the following formula:

$$ay_{max} = \rho(L\text{max}) \cdot v^2$$

in which:
- ρ(Lmax) denotes the curvature of the traffic lane at a distance Lmax from the vehicle.
- v denotes the speed of the vehicle.

The curvature of the traffic lane can also be calculated at a fixed distance from the vehicle. It can be determined using the detection means if the latter have a sufficient viewing range or else be obtained via the embedded navigation system 9. Assuming the latter, the curvature of the traffic lane can be sent from the navigation system to the electronic control unit. The use of data from the navigation system makes it possible to calculate the curvature of the traffic lane even when the detection means have an insufficient viewing range.

In a third step E3, the lateral acceleration is compared to a threshold S1. This threshold S1 can be, for example, equal to 0.2 g or 0.25 g, but, as a variant, it could be defined with a different value, chosen after tests on the vehicle. This comparison makes it possible to distinguish ordinary driving situations in which the turns are not tight and in which the lateral accelerations are low, from driving situations in which the turns are tighter and in which the viewing range of the detection means is reduced.

In a fourth step E4, a gain G is calculated, which will be useful for the calculation of the open loop component for weighting the contribution of the open loop component FFD. Two cases can be distinguished according to which the lateral acceleration is greater than or equal to the threshold S1 or strictly less than the threshold S1.

In the case where the lateral acceleration is strictly less than the threshold S1, the gain G is defined as a decreasing function of the sighting distance L. In other words, the greater the sighting distance, the lower the gain G and the lower the contribution of the open loop component FFD in the calculation of the setpoint angle will be.

The gain G can lie between 0 and 1 inclusive. The contribution of the open loop component is therefore at most equal to the value that it would have if the gain G were not taken into account. When the gain G is strictly less than 1, the contribution of the open loop component to the calculation of the steering angle setpoint is therefore marked down.

The gain G can be equal to 1 when the sighting distance is zero. Thus, if the viewing range of the detection means is zero, then the contribution of the open loop component is not marked down.

In more detail, and still in the case where the lateral acceleration is strictly less than the threshold S1, the fourth step E4 can comprise a first substep E41, in which the sighting distance L of the detection means on board the vehicle 1 is calculated. As seen previously, the sighting distance L can be calculated with the following formula:

$$L = \min(L\text{max}, L\text{range})$$

in which:
- Lmax denotes a predefined distance.
- Lrange denotes the viewing range of the detection means of the vehicle.

Next, in a second substep E42, the gain G can be calculated by means of a function dependant on the sighting distance. The gain G can notably be calculated with the following formula:

$$G = 1 - \frac{L}{L_{max}} * \beta$$

Figure 6:
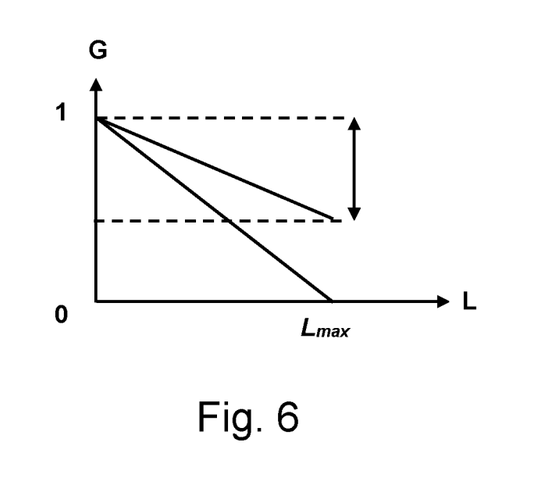
FIG. 6 is a graph illustrating the trend of an open loop gain of the regulator as a function of the sighting distance.

In which β denotes a parameter which can be adjusted during a calibration phase of the vehicle. The parameter β can be less than or equal to 1 and strictly greater than 0. FIG. 6 illustrates two gain G calculation functions given by way of example. According to a first function F1, the gain G decreases linearly from 1 (when the sighting distance at 0) up to 0 (when the sighting distance is equal to the predefined distance Lmax). The parameter 13 of the first function F1 is therefore equal to 1. The function F2 represents a second example of calculation of the gain G in which the parameter β is strictly less than 1.

In the case where the lateral acceleration is greater than or equal to the threshold S1, the gain G can be set at a predefined value γ, independent of the sighting distance.

Next, in a fifth step E5, the open loop component FFD of the steering angle setpoint is calculated. This open loop component can be substantially equal to the steering angle of the steered wheels necessary to follow the curvature of the road δeq, weighted by the gain G calculated in the fourth step E4. Thus, the open loop component can be calculated with the following formula:

$$FFD = G \cdot \delta eq$$

The steering angle of the steered wheels necessary to follow the curvature of the road δeq can be calculated by the following formula:

$$\delta eq = \rho.v. \frac{a11 \cdot a32 - a12(a31 - v)}{a12 \cdot a36 - a16 \cdot a32}$$

in which:
- ρ denotes the curvature of the traffic lane at the height of the vehicle
- v denotes the speed of the vehicle
- a11, a12, a16, a31, a32, a36 are components of a matrix A which will be defined later, these components being a function of the intrinsic characteristics of the vehicle 1 and of its speed.

In a sixth step E6, the closed loop component FBK of the steering angle setpoint is calculated. The closed loop component makes it possible to correct the open loop component to best follow the reference path regardless of the state of the vehicle and/or the outside conditions. The closed loop component is calculated by means of a closed loop regulator. This regulator is based on the state representation of the vehicle. The closed loop component aims to correct all the reference state vector Xref and notably correct the heading angle ψ, the derivative of the heading angle dψ/dt, and the steering angle δ of the wheels so as to match these parameters with those of the reference state vector Xref.

Figure 5:
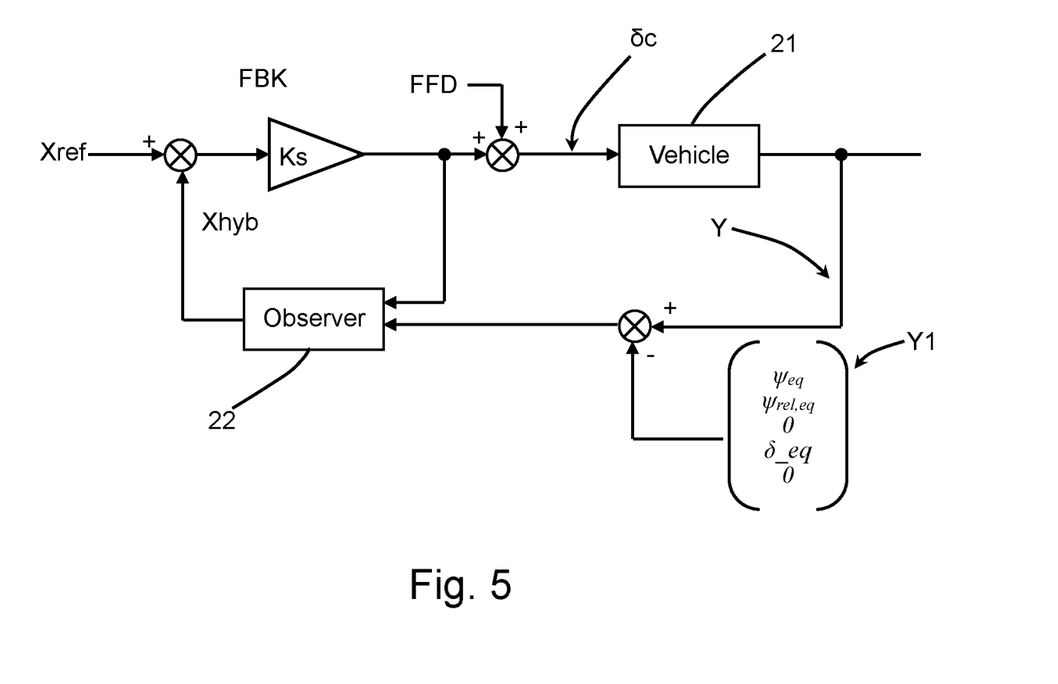
FIG. 5 is a schematic view of a regulator implemented in the control method.

FIG. 5 represents a control system according to an embodiment of the invention. The hybrid vector Xhyb is represented therein at the output of the observer to simplify the representation, bearing in mind that this output is not direct since a hybrid vector Xhyb has been chosen which is reconstructed for its two observed states by taking up the direct output of the observer for these two states and by taking up the measured values of the five other states. Nevertheless, as a variant, the vector Xhyb could not be hybrid and could contain only observed states, as represented in FIG. 5.

In a first substep E61 of the sixth step E6, an observed state vector is calculated that characterizes the position and the path of the vehicle on the traffic lane 11 and a hybrid state vector Xhyb is reconstructed which contains five measurements (dψ/dt, ψ, yL, δ and −Iy) and two observed states (dy/dt and dδ/dt) in order to reconstruct these states dy/dt and dδ/dt which are not known from measurement. The reference state vector Xref of the vehicle which constitutes the setpoint is independent of the hybrid state vector at a given instant. The hybrid state vector can be defined as follows:

$$Xhyb = \begin{pmatrix} d\psi/dt \\ \psi \\ dy/dt \\ yL \\ d\delta/dt \\ \delta \\ -Iy \end{pmatrix}$$

The hybrid state vector therefore comprises seven components. Generally, the state vector can characterize the position, the speed and the acceleration undergone by the vehicle at a given instant. The hybrid state vector is therefore a vector that is variable in time. Of the seven components of the hybrid state vector, the components $d_\psi/dt$, $\Psi$, dy/dt, dδ/dt, δ and −Iy characterize the position and the path of the vehicle 1 at the present instant, that is to say the instant during which the control method is executed or in its real position. As seen previously, the characteristic yL corresponds to the lateral deviation with respect to the reference path 12 of a point which is at a sighting distance L in front of the vehicle, at right angles to the tangent to the path at the vehicle. As a variant, the components of the state vector could be represented in a different order. The following description would then be adapted accordingly.

The hybrid state vector Xhyb is reconstructed from the observed vector and the measurements, so it is calculated from sensors embedded in the vehicle, from a kinematic model of the vehicle (identified by 21 in FIG. 5) and from an observer (identified by 22 in FIG. 5). The kinematic model 21 can be described by the following equation:

$$dXhyb/dt = A \cdot Xhyb + B1 \cdot \delta c + B2 \cdot \rho$$

An equation in which:

dXhyb/dt is the derivative with respect to time of the hybrid state vector Xhyb, δc is the steering angle setpoint of the steered wheels calculated in a preceding iteration of the control method, ρ is the curvature of the traffic lane, A is a 7×7 matrix which will be defined later, B1 and B2 are vectors with seven components defined later.

The matrix A can be defined by the following formula:

$$A = \begin{pmatrix} -\frac{(c_f l_f^2 + c_r l_r^2)}{I_z v} & \frac{(c_f l_f - c_r l_r)}{I_z} & -\frac{(c_f l_f - c_r l_r)}{I_z v} & 0 & 0 & \frac{(c_f l_f)}{I_z} & 0 \\ 1 & 0 & 0 & 0 & 0 & 0 & 0 \\ -\frac{(c_f l_f + c_r l_r)}{mv} & \frac{(c_f + c_r)}{m} & -\frac{(c_f + c_r)}{mv} & 0 & 0 & \frac{c_f}{m} & 0 \\ L & 0 & 1 & 0 & 0 & 0 & 0 \\ 0 & 0 & 0 & 0 & -2\zeta\omega & -2\omega^2 & 0 \\ 0 & 0 & 0 & 0 & 1 & 0 & 0 \\ 0 & 0 & 0 & -1 & 0 & 0 & 0 \end{pmatrix}$$

in which:

cf denotes the cornering stiffness of a front end of the vehicle, cr denotes the cornering stiffness of a rear end of the vehicle, lf denotes the distance between the center of gravity C of the vehicle and the front end, lr denotes the distance between the center of gravity C of the vehicle and the rear end, Iz denotes the inertia of the vehicle, m denotes the weight of the vehicle, v denotes the speed of the vehicle, ζ denotes a damping factor of the steering system, ω denotes an eigenfrequency of a filter of the steering system, L denotes the sighting distance.

The parameters $c_f$, $c_r$, $l_f$, $l_r$, $I_z$, m, ζ and ω are therefore constants characterizing the vehicle. They can be defined once and for all in the development of the vehicle and be stored in the memory of the electronic control unit.

In defining the component of the row i and the column j of the matrix A by "aij", the useful parameters a11, a12, a16, a31, a32, a36 are defined for the calculation of the steering angle δeq used in the calculation of the open loop component FFD. In particular, the following apply:

$$a11 = \frac{(c_f l_f^2 + c_r l_r^2)}{I_z v}$$

$$a12 = \frac{(c_f l_f + c_r l_r)}{I_z}$$

$$a16 = \frac{(c_f l_f)}{I_z}$$

$$a31 = \frac{(c_f l_f - c_r l_r)}{mv}$$

$$a32 = \frac{(c_f + c_r)}{m}$$

$$a36 = \frac{c_f}{m}$$

The matrix A is multiplied by the state vector Xhyb. The integration of the sighting distance L in the matrix A makes it possible to compensate for the marking down of the open loop component FFD due to its multiplication by the gain G. Thus, advantageously, the greater the sighting distance, the lower the weight of the open loop component and the greater the weight of the closed loop component FBK. As a variant, the sighting distance L could be integrated in another way in the calculation of the closed loop component.

The vector B1 can be defined by the following formula:

$$B1 = \begin{pmatrix} 0 \\ 0 \\ 0 \\ 0 \\ \omega^2 \\ 0 \\ 0 \end{pmatrix}$$

in which $\omega$ denotes the eigenfrequency of a filter of the steering system.

The vector B2 can be defined by the following formula:

$$B2 = \begin{pmatrix} 0 \\ -v \\ -v^2 \\ -L \cdot v \\ 0 \\ 0 \\ 0 \end{pmatrix}$$

in which:

v denotes the speed of the vehicle.

L denotes the sighting distance.

Moreover, a measurement vector Y can be defined by the following formula:

$$Y = C \cdot Xhyb$$

in which C denotes a diagonal matrix that makes it possible to isolate the state variables that make up the hybrid vector Xhyb which are directly accessible by virtue of the sensors on board the vehicle 1. The matrix C is therefore a matrix which depends on the measurements that are accessible on the vehicle. The vector Y can then be defined by the following formula:

$$Y = \begin{pmatrix} d\psi/dt \\ \psi \\ yL \\ \delta \\ -ly \end{pmatrix}$$

Based on the kinematic model 21 presented above, of the observer 22 and of the vector Y, the state vector Xhyb can be calculated. The observer 22 allows the unmeasured components of the hybrid state vector to be estimated. The observer 22 can use as input, on the one hand, the closed loop component FBK calculated in a preceding iteration of the method, and, on the other hand, the vector Y. When starting from the principle that the vehicle is on a straight line, a reference state vector Xref equal to zero is used. The steering angle of the steered wheels necessary to follow a turn is provided by the open loop component FFD. Moreover, the measurement must also be corrected to "extract" the turn part of the state vector Xhyb. To do this, a vector Y1 defined by the formula below can be subtracted from the vector Y.

$$Y1 = \begin{pmatrix} d\psi/dt \\ \psi \\ 0 \\ \delta \\ 0 \end{pmatrix}$$

In a second substep E62 of the sixth step E6, the closed loop component FBK is calculated on the basis of a comparison between the reference state vector Xref of the vehicle and the hybrid state vector Xhyb. The difference between the reference state vector Xref and the hybrid state vector Xhyb is first calculated. Thus, a vector Xerr representing the error between the theoretical state of the vehicle and its real state is obtained. The vector Xerr can therefore be defined by the following formula:

$$Xerr = Xref - Xhyb$$

The vector Xerr is then multiplied by a control vector Ks, dependent on the speed v of the vehicle. The closed loop component is thus obtained by the following calculation:

$$FBK = Ks \cdot Xerr$$

Note that the vector Ks is defined as a function of the speed of the vehicle. The memory of the electronic control unit can therefore contain different values of the vector Ks defined for predefined speed values. When the vehicle effectively travels at an intermediate speed between two predefined speed values, the vector Ks can be interpolated using a weighting of vectors Ks stored for a speed greater than and a speed less than the real speed of the vehicle.

In a seventh step E7, the steering angle setpoint $\delta c$ of the steered wheels is calculated by adding the open loop component FFD and the closed loop component FBK. The steering angle setpoint $\delta c$ can therefore be calculated using the following formula:

$$\delta c = FBK + FFD$$

The steering angle setpoint $\delta c$ is then sent to the steering device 4 which orients the steered wheels according to the steering angle setpoint $\delta c$. This setpoint $\delta c$ is also used for the calculation of the hybrid state vector Xhyb in a next iteration of the control method.

Note that the control method which has just been described could also be equally transposed to a method for calculating a steering angle of the steered wheels since it is the orientation of the steered wheels of the vehicle which makes it possible to adjust the lateral position of the vehicle. Likewise, the method could also be transposed to a method for calculating a steering wheel angle since the steering wheel angle and the steering angle of the steered wheels are linked to one another by a proportionality link. The control method could also be applied to any quantity correlated by a function known at the lateral position of the vehicle.

By virtue of the invention, an angle calculation is obtained for calculating the steering angle setpoint of the steered wheels which is more independent of the factors that can disturb the dynamic behavior of the vehicle. The method according to the invention does not require the prior identification of these factors.

The invention relates also to a method for calibrating the method for controlling the lateral position of the vehicle. For the calibration, or, in other words, the parameterizing, of the control method, tests on tracks can be performed. The calibration of the control method aims notably to determine a value for the parameters $\beta$ and $\gamma$ defined previously.

In a first step C1 of the calibration method, tests are performed on a first journey, in which the vehicle will undergo lateral accelerations strictly less than the threshold S1. The first step C1 comprises a first substep C11 of measurement of the lateral deviation of the vehicle with respect to the reference path 12 when the vehicle performs the first journey, the sighting distance being defined as equal to zero. A reference lateral deviation yref is thus obtained.

In a second substep C12, the first journey is repeated and the sighting distance is gradually increased with the reduction of the gain G. This second step C12 is repeated as long as the lateral deviation y of the vehicle with respect to the reference path is substantially equal to the reference lateral deviation yref. "Substantially equal" should be understood to mean that the difference between the lateral deviation y and the reference lateral deviation yref is less than a threshold. It is thus possible to construct a characteristic of the sighting distance as a function of the gain G. Based on this characteristic, the parameter 13, which makes it possible to best approximate this characteristic, can be defined.

In a second step C2 of the calibration method, tests are performed on a second journey, in which the vehicle will undergo lateral accelerations greater than or equal to the threshold S1. The second step C2 comprises a first substep C21 of definition of the sighting distance L of the vehicle. The sighting distance L is then defined as equal to the predefined distance Lmax.

In a second substep C22, the second journey is performed successively while gradually increasing the gain G. The second substep C22 is repeated until the lateral deviation of the vehicle with respect to the reference path is less than or equal to a threshold, for example a threshold of 30 centimeters. The value of the gain G that makes it possible to obtain a lateral deviation with respect to the reference path less than this threshold can be defined as the gain value γ.

Finally, through circuit tests, an ideal trade-off is able to be found for controlling the lateral position of the vehicle on a traffic lane. On the one hand, the vehicle follows the reference path without deviating therefrom too significantly. Notably, the vehicle does not excessively cut the turns. On the other hand, the vehicle is controlled without jerks or abrupt movements that would be disagreeable for the passengers.

The application of this invention is also suitable for a vehicle with four steered wheels, with the use of a suitable bicycle model being sufficient.

The invention claimed is:

1. A control method for controlling a lateral position of a motor vehicle using an electronic control unit, the control method comprising:
   calculating a sighting distance of a detection means on board the vehicle;
   calculating a first component of a steering angle setpoint of steered wheels of the vehicle, the first component being an open loop component of a control system, the first component being weighted by a gain, the gain being a decreasing function of the sighting distance;
   calculating a second component of the steering angle setpoint, the second component being a closed loop component of the control system;
   calculating the steering angle setpoint; and
   controlling a steering device of the motor vehicle to orient the steered wheels according to the steering angle setpoint.

2. The control method as claimed in claim 1, wherein the gain lies between 0 and 1 inclusive.

3. The control method as claimed claim 1, wherein the gain is at least one of a decreasing linear function of the sighting distance, and equal to 1 when the sighting distance is zero.

4. The control method as claimed in claim 1, wherein the steering angle setpoint is calculated as a sum of the open loop component and of the closed loop component.

5. The control method as claimed in claim 1, wherein the calculating the second component comprises calculating a state vector of the vehicle, the state vector comprising a component equal to a lateral deviation of the vehicle with respect to a reference path at the sighting distance.

6. The control method as claimed in claim 5, wherein the calculating the second component of the steering angle setpoint comprises multiplying the lateral deviation of the vehicle at the sighting distance by the sighting distance.

7. The control method as claimed in claim 1, further comprising:
   calculating a future lateral acceleration of the vehicle; and
   comparing the lateral acceleration to a threshold,
   the gain being equal to a predefined value independent of the sighting distance when the lateral acceleration is greater than or equal to the threshold, and
   the gain being a decreasing function of the sighting distance when the lateral acceleration is less than the threshold.

8. The control method as claimed in claim 7, wherein the calculating of the future lateral acceleration of the vehicle comprises acquiring a curvature of a traffic lane via a navigation system.

9. The control method as claimed in claim 1, wherein the calculating of the sighting distance comprises a selection of a minimum value between a predefined distance and a viewing range of the detection means of the vehicle.

10. A computer program product comprising program code instructions stored on a medium that can be read by the electronic control unit for implementing the control method as claimed in claim 1.

11. A data storage medium, that can be read by the electronic control unit, on which is stored a computer program comprising program code instructions for implementing the control method as claimed in claim 1.

12. A steering system comprising at least the electronic control unit and the steering device of claim 1 for implementing the control method as claimed in claim 1.

13. A motor vehicle comprising the steering system according to claim 12.

14. A method for calibrating the motor vehicle as claimed in claim 13 and further comprising:
   measuring a reference lateral deviation of the vehicle with respect to a reference path when the vehicle makes a first journey, the sighting distance being defined as equal to zero,
   gradually increasing the sighting distance and of reducing the gain as long as a lateral deviation of the vehicle with respect to the reference path is substantially equal to the reference lateral deviation when the vehicle makes the first journey,
   defining the sighting distance as equal to a predefined distance, and gradually increasing the gain until the lateral deviation (y) of the vehicle with respect to the reference path is less than or equal to a threshold, when the vehicle makes a second journey.

* * * * *